Patented Mar. 11, 1952

2,588,460

UNITED STATES PATENT OFFICE 2,588,460

METHOD OF PRODUCING LACTIC ACID

Robert S. Aries, New York, N. Y., and Haskell C. Needle, Chicago, Ill.

No Drawing. Application April 22, 1950, Serial No. 157,628

7 Claims. (Cl. 195—48)

This invention relates to a method for producing substantially water-white edible or light technical grades of lactic acid from cereal grains and from the starch bearing intermediate products of the cereal milling industries, said intermediates containing sufficient starch in their composition to warrant their use.

This invention has as an object the production of highly refined grades of lactic acid, for example, acids which meet United States Pharmacopeia specifications, and the grades of lactic acid used in the plastic industry. The lactic acid obtained from the fermentation of the aforementioned cereal grains and starch intermediates may be employed in the form of its many esters.

It is acknowledged that to produce an edible grade of lactic acid, three prior art processes are available. One of these processes employs a sugar, such as dextrose, in a state of high purity. The second process employs a crude sugar product, such as blackstrap molasses, which is fermented to crude lactic acid and purified either by a plurality of crystallizations or by esterification with an alcohol, or by a liquid-liquid extraction technique. The third process comprises the acid hydrolysis under pressure of substantially pure starch, followed by neutralization of the acid filtration of the resulting neutral dark-liquor decolorization and finally fermentation to lactic acid.

These prior art processes require a vast amount of labor and a large expenditure of materials, equipment, power, and time.

In the manufacture of lactic acid from corn dextrose by a process now industrially used, the germ is first removed from the kernel and the starch is tabled to remove the major part of the gluten. The starch is then washed from the tables, refined, and converted to sugars with the aid of acids and elevated pressures. The resulting sugars are then neutralized, filtered to remove impurities, decolorized with carbon, and further refined, again with carbon. After being concentrated the sugars are crystallized, centrifuged and finally dried. All these prior art steps are required, before these converted sugars are ready for fermentation to lactic acid. For best results a substantially pure crystallized sugar is preferred, because inversion products detrimental to fermentation are thereby avoided, as are also color bodies that are difficult to decolorize.

The use of crude sugars, such as blackstrap molasses, in the prior art processes, presents a difficulty in as much as the final acid is of a dark color and because this acid cannot be concentrated beyond a concentration of about 55% lactic acid. This substantially low acid concentration produces an azeotropic condition in the esterification step of the refining procedure thereby requiring excessive refinements of operation with a consequent reduced efficiency. Refining such an acid may be accomplished by crystallizing out calcium lactate, employing several recrystallizations, to produce a water-white, edible lactic acid.

Our invention includes the economical utilization of cereal grains and the starch intermediate products thereof, for the production of various grades of lactic acid by a fermentation process that dispenses with the necessity of preliminary time consuming treatments wherein starch is first changed to sugars with subsequent fermentation of the converted sugars.

Our invention is described herein with reference to corn, specifically, because this grain is an inexpensive source of starch but this invention is also operable with substantially any grain or cereal starch.

Our process relies upon recently discovered commercial enzymes having excellent liquefying and saccharifying properties. These enzymes may be purchased in crude form associated with their original growth substrates. It is not necessary to concentrate or refine these commercial enzymes. An advantage of this invention, from an economical viewpoint, is the use of such crude enzymes. However, refined enzymes are also operable in our process.

By way of an example, but not as a limitation of our invention the following detailed process is presented:

To a slurry comprising 1500 pounds of corn meal, 250 pounds of ground limestone and approximately 750 gallons of water, there are added 8 pounds of a liquefying commercial enzyme such as "Liquezyme" derived from a bacterial source. The resulting mash is slowly heated to 70° C. by means of steam coils and maintained at that temperature for about one-half hour.

The mash is then heated rapidly, by means of steam coils and steam spargers, to the boiling point whereupon the heating process is discontinued and cold water is added to yield 1,000 gallons of material, meanwhile maintaining the temperature at 70° C. An additional 7 pounds of "Liquezyme" are now added and the temperature is maintained at 70° C., for another one-half hour. The product is then rapidly heated to 85° C., and then cooled to 50° C. whereupon 250 pounds of ground limestone and 45 pounds of a saccharifying enzyme such as "Diatane" derived from a mold source are added, and the mash is simultaneously inoculated with 50 gallons of an active culture of Lactobacillus delbruckii and allowed to ferment until all the starchy materials and sugars have been converted to lactic acid. The mash is continuously agitated throughout the entire procedure at a rate of speed sufficient to maintain all materials in suspension, which rate is approximately 20 revolutions per minute. Agitation must be increased during the gelation stage, since the mash becomes very viscous and difficult to keep in motion at this point. After completion of the fermentation step, the mash is filtered to yield the desirable lactic acid. The solid residue obtained from the filtration step is preferably dried and sold as animal feed, or it may be further processed to recover corn oil. The remaining gluten material, after oil extraction, may be used as a base for production of hydrolyzed protein and mono-sodium glutamate, products valuable as flavoring agents in the food industries.

The addition of half the amount of limestone at the start of the conversion process results in an acceleration of the enzyme action, because of an effect that calcium ions have on enzymatic action.

Larger amounts of enzyme may be added, if desired, to accelerate the conversion process. In our inventive process complete fermentation of cereal mashes is effected within 48 hours; whereas normally it would take from 5 to 7 days by the prior art processes previously described.

It is to be understood that many variations of the example given above may be resorted to without departing from the scope of our invention. For example, a greater or a lesser concentration of enzyme than that given in the example may be used, and the quantity of the cereal grains, and of the inoculant may be varied. Furthermore, other nutrient materials may be added to aid in accelerating the fermentation. These nutrients include malt sprouts, distillers grains, saline phosphates, and the like.

Although highly refined and concentrated enzymes may be used, the crude forms associated with their original substrates are preferred because of economical factors. These crude enzymes are high in liquefying and saccharifying power and appear to work symbiotically with the ferments of the lactobacilli to carry the fermentation of the carbohydrates to completion in much less time than is ordinarily the case with those mashes using pure or crude sugars as substrates.

The lactic acid resulting from our process is easily refined with carbon to yield a water-white color and can be concentrated without a preliminary decolorization to an acid concentration of 80 to 85%, thereby facilitating the esterification process for the production of highly refined plastic grades of the acid.

Other commercial liquefying enzymes suitable for use in our process are: "Diastofor" derived from a bacterial and a mold source; various "Rhozyme" derived from a bacterial and a mold source; and "Fluidase" derived from a bacterial source. Other commercial saccharifying enzymes suitable for use in our process are: "Sacrazyme"; "Eaglezyme"; and "Protozyme." Each of these trade-marked products is essentially a bacterial or mold enzyme material comprising a culture of enzyme producing bacteria or mold on granular solids, or extract of such culture, or a concentrate of such extract, for the hydrolysis or degradation of starchy and proteinaceous substance in the conversion or fermenation of grain mashes and the like.

The utilization of the process of our invention produces an economical lactic acid, because of the use of inexpensive substrates, and the requirement of little equipment, labor, and power.

It is to be understood that our process may be used for other types of fermentations where sugar substrates are used or where the mash is converted by malt.

We claim:

1. The method of rapidly producing concentrated highly purified lactic acid comprising treating starch with a crude liquefying enzyme produced by bacteria and molds associated with its growth substrate to effect a liquefaction of the starch, and thereafter treating the liquefied product simultaneously with crude saccharifying enzymes produced by bacteria and molds associated with its growth substrate along with a culture of Lactobacillus delbrucki to effect a simultaneous saccharification action and fermentation action whereby the saccharification and fermentation is substantially completed within about 48 hours.

2. The process of claim 1 wherein the crude liquefying enzyme is "Liquezyme" derived from a bacterial source and the crude saccharifying enzyme is "Diatane" derived from a mold source.

3. The process of claim 1 wherein there is added to the crude liquefying enzyme an effective amount of limestone to maintain an effective alkalinity.

4. The method of claim 1 wherein the liquefaction of the starch is effected in the presence of said limestone at a temperature of about 70° C.

5. The process of claim 2 wherein the liquefying enzyme is "Fluidase" derived from a bacterial source.

6. The process of claim 2 wherein the liquefying enzyme is "Diastofor" derived from a bacterial and mold source.

7. The process of claim 2 wherein the liquefying enzyme is "Rhozyme" derived from a bacterial and mold source.

ROBERT S. ARIES.
HASKELL C. NEEDLE.

REFERENCES CITED

The following references are of record in the file of this patent:

UNITED STATES PATENTS

| Number | Name | Date |
|---|---|---|
| 1,074,708 | Friedberger | Oct. 7, 1913 |
| 1,548,721 | Ling et al. | Aug. 4, 1925 |
| 2,219,368 | McPherson et al. | Oct. 29, 1940 |

FOREIGN PATENTS

| Number | Country | Date |
|---|---|---|
| 10,436 | Great Britain | of 1905 |

OTHER REFERENCES

Prescott and Dunn, Industrial Microbiology, McGraw-Hill, 1940, page 262.

Tauber, Chemistry and Technology of Enzymes, John Wiley & Sons, 1949, pages 62, 63, 64, 73, 75, 76, 77, 81.